(12) United States Patent
Bhagwat et al.

(10) Patent No.: US 6,651,105 B1
(45) Date of Patent: Nov. 18, 2003

(54) METHOD FOR SEAMLESS NETWORKING SUPPORT FOR MOBILE DEVICES USING SERIAL COMMUNICATIONS

(75) Inventors: Pravin Bhagwat, Scarsdale, NY (US); Chatschik Bisdikian, Mount Kisco, NY (US); Ibrahim Korpeoglu, Yorktown Heights, NY (US); Mahmoud Naghshineh, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,952

(22) Filed: Nov. 12, 1999

Related U.S. Application Data

(60) Provisional application No. 60/108,068, filed on Nov. 12, 1998, and provisional application No. 60/108,069, filed on Nov. 12, 1998.

(51) Int. Cl.[7] .............................................. G06F 15/16
(52) U.S. Cl. ....................................... 709/239; 709/227
(58) Field of Search ................................ 709/245, 217, 709/223, 236, 219, 239, 227; 375/225; 370/338, 400, 401, 349; 455/432

(56) References Cited

U.S. PATENT DOCUMENTS

| 5,987,062 | A | * | 11/1999 | Engwer et al. .............. 375/225 |
| 6,052,725 | A | * | 4/2000 | McCann et al. ............ 709/223 |
| 6,195,705 | B1 | * | 2/2001 | Leung ........................ 709/245 |
| 6,215,779 | B1 | * | 4/2001 | Bender et al. .............. 370/338 |
| 6,298,060 | B1 | * | 10/2001 | Miyakawa et al. ......... 370/400 |
| 6,411,807 | B1 | * | 6/2002 | Amin et al. ................. 455/432 |
| 6,421,714 | B1 | * | 7/2002 | Rai et al. .................... 709/217 |
| 6,424,653 | B1 | * | 7/2002 | Arsikere et al. ............ 370/401 |

* cited by examiner

*Primary Examiner*—Nabil El-Hady
*Assistant Examiner*—Jungwon Chang
(74) *Attorney, Agent, or Firm*—Louis P Herzberg

(57) ABSTRACT

The present invention provides a method, apparatus and computer product for a mobile device to roam securely and seamlessly from one access point to another access point without disrupting an active PPP connection. The method includes establishing, maintaining, and terminating a PPP connection between a mobile device and a PPP server via an access point, wherein the mobile device is equipped with a serial asynchronous communication interface. The PPP server is attached to a packet switched data network, and the access point is acting as a bridge between the serial communication interface and the packet switched communication interface. Also provided is a method to emulate a direct RS-232 cable connection between a mobile device and another computer located several hops away from the mobile device. It provides a method of keeping the RS-232 cable emulation between the mobile device an another computer system intact despite changes in mobile device's location in the network. It also provides a method of exchanging cookies between peers at the PPP connection establishment time and using them for fast reauthentication. This is a secure method of switching from one PPP proxy to another PPP proxy without disrupting the end to end PPP connection.

12 Claims, 8 Drawing Sheets

METHOD FOR SEAMLESS NETWORKING SUPPORT FOR MOBILE DEVICES USING SERIAL COMMUNICATIONS

CROSS-REFERENCE TO RELATED APPLICATIONS

This application claims priority from Provisional Applications, Ser. No. 60/108,068 and Ser. No. 60/108,069, both filed Nov. 12, 1998. This application is cross-referenced to the application Ser. No. 09/439,951 filed Nov. 12, 1999 which is being filed concurrently herewith and is herein incorporated by reference in entirety.

FIELD OF THE INVENTION

This invention relates to the field of networking. It is more particularly directed to seamless networking support to devices connected via a serial communication.

BACKGROUND OF THE INVENTION

The majority of handheld computing devices, such as palmtop computers, consumer electronic devices, pagers, cell phones, and digital cameras are equipped with serial port communication interfaces. Such devices are connected to other computer systems using a RS-232 serial cables or modem connected telephone lines. Point-to-point protocol (PPP) is the most commonly used protocol for connecting serial port devices to wired networks such as the Internet. Since-users of handheld devices are mobile, it is desirable to enable wireless connectivity over serial links and provide seamless mobile and non-mobile networking solution to users of portable computers.

Having a wireless link enables mobility and ease of use. Wireless connectivity together with mobility enables a rich set of new applications such as seamless data synchronization, continuous access to network resources, collaboration among a group of people, etc. For indoor wireless access, several short range wireless technologies are being developed by various industry groups. Due to power, cost, and regulatory constraints, it is expected that the range of the wireless link from a palmtop device to a static access point is quite short (10 m–20 m). Hence, a set of access points are installed to cover a usage area such as an office building. Such a solution implies that the wireless access and mobility will be limited to a range covered by these access points, but this is generally not a very significant limitation considering that these palmtop devices will be mostly used inside closed areas, such as office buildings, airports, shopping centers, hotel rooms, homes, etc.

FIG. 1 shows an example of a Intranet 110 providing wireless access to handheld devices 130, 132, 135. Each access point 120, 125 acts as a bridge between the wireless and wired medium. A handheld device 130 within the communication range 140 of the access point 120 can access the network through that access point 120. This scenario of a system that supports wireless access using short-range radio anywhere inside a building covered by access points highlights the problem of how to provide mobility support for these devices 130, 132.

The support should allow these devices to seamlessly move from the range of an access point range 140 to another access point range 150. This should still preserve the network connectivity-without the users being aware of the hand-offs from range to range. It would be advantageous to have-a way which provides a seamless, secure mobility protocol for this kind of scenario.

Serial links provide synchronous or asynchronous byte or bit oriented communication which do not have notion of packet boundaries. However, network layer protocols, such as IP, require an underlying link layer that is packet oriented. The Point-to-Point Protocol (PPP), RFC 1661, Internet Engineering Task Force Standard is herein incorporated by reference in entirety. The PPP protocol provides such a packet oriented link layer interface to the network layer, hence a large number of devices that use serial communication run PPP protocol to connect to the Internet.

PPP protocol provides a standard method for transporting multi-protocol network (IP, IPX, AppleTalk . . . ) datagrams over point-to-point links. It is comprised of mainly three main components: 1) A method of encapsulating multi-protocol datagrams; 2) A Link Control Protocol (LCP) for establishing, configuring, and testing data-link connections; 3) A family of Network Control Protocols (NCPs) for establishing and configuring different network layer protocols. PPP is connection oriented. The peers establish a PPP connection before communicating any data. Connection establishment include negotiation of a set of parameters for LCP, NCP, and other control protocols (Encryption Control Protocol (ECP), Compression Control Protocol (CCP), etc.). After this network layer datagrams can be sent over the link.

PPP protocol is used between two PPP peers located at the end of a PPP link: user (device) side PPP peer and network side PPP peer. The network layer above the network side PPP peer is the gateway to the Internet and forwards IP datagrams between a mobile device and the Internet over the PPP link. The network layer above the device side PPP peer enables legacy applications to be run transparently over the PPP links.

Mobile IP provides a link layer independent mobility solution for mobile hosts connected to the Internet. It can be used for various kinds of link layers: PPP links, Ethernet links, ATM etc.

A mobile host has a permanent home IP address which does not change upon movement to a new subnet. When a mobile host moves to a new subnet other than its home subnet, it registers its current location—the IP address of a foreign agent in the new subnet or a temporary IP address obtained by mechanisms such as DHCP- with an agent in its home subnet, called home agent. The home agent then intercepts IP packets destined to the mobile device and forwards them to the current location by mechanisms called IP-IP encapsulation and IP tunneling. If the mobile host has registered the IP address of a foreign agent with the home agent, then the packets are forwarded to this foreign agent which then forwards them to the mobile host. If the mobile host has registered a co-located IP address with its home agent, then the packets are directly forwarded to the mobile host. For security reasons, a mobile host authenticates itself to its home agent with each registration. The authentication is based on a shared secret key that can be manually configured in a mobile device and its home agent.

A first attempt to provide a seamless mobility solution for palmtop devices might be to use Mobile IP which is an already established standard. FIG. 2 shows such a scenario. A mobile host device MH 250 establishes a PPP connection 230 with the access point AP1 220 which is a gateway to the Internet 'Internetwork' 215. AP1 220 also runs a Mobile IP foreign agent, FA 225. All packets destined for the mobile host 250 will be first routed to the home agent HA 210. HA 210 then forwards the packets to the foreign agent FA located in AP1 220. FA 220 then forwards these packets to the mobile device MH 250 over the PPP link 230.

When the mobile device 250 moves out of range of AP1 220 to the range of AP2 225, it has to establish a new PPP connection 240 with AP2 225. If AP1 220 and AP2 225 are not in the same subnet, it also has to register its current location—IP address of the current foreign agent—with its home agent 210 using the Mobile IP registration and authentication protocol. After this the communication to the mobile device can resume. Since the range of the wireless link is short, these operations may need to be repeated quite frequently (with each hand-off to a new access point).

Such a solution has the following drawbacks:

A new PPP connection needs to be established with every hand-off. PPP connection establishment includes link configuration, authentication, network layer configuration, and optional encryption and compression parameter negotiations. Each parameter negotiation phase increases hand-off latency which may be unacceptable in micro-cellular, indoor wireless environments. Additionally, these negotiations waste bandwidth by introducing extra traffic on the wireless link.

Layering Mobile IP on top of PPP adds to handoff latency because Mobile IP layer performs its own set of registration and authentication exchanges;.

This solution is difficult to deploy since Mobile IP protocol is not supported on most mobile devices.

SUMMARY OF THE INVENTION

In order to overcome the problems identified, the present invention provides a method, apparatus and/or protocol for emulating a direct serial line over a multihop packet data network. Use of the serial line emulation protocol of the present invention allows devices equipped with serial communication interfaces to be connected over a packet data network to their peers.

Another aspect of the invention provides support for mobility without requiring changes to the networking software on mobile and non-mobile devices. Network connectivity for devices is preserved after handoff from one access point to another access point.

In an embodiment, the invention is used to emulate a direct RS-232 cable connection between a mobile device and its peer through a wireless access point. When the mobile host moves, the cable emulation protocol reestablishes the emulated RS-232 link, thereby hiding effects due to mobility from the higher layers.

In another embodiment, the present invention establishes a persistent PPP connection between a mobile device and a PPP server. Instead of running a PPP server on each wireless access point, the PPP function is aggregated into a server located in the network. The access point acts like a PPP proxy, bridging the wireless and the wired medium. On the wireless side the access point emulates an RS-232 lines, while on the wireline side the access point emulates a byte stream tunnel to the PPP server. When a portable device moves, it notifies its PPP peer using a new PPP option to switch the byte stream tunnel to another access point. Since the portable device carries its PPP state with it, it always remains connected to the same PPP server as before (albeit over a different emulated wire). No change in IP address is required and, consequently, none of the active connections are disrupted.

Another aspect of the proposed invention is that negotiation phases of higher layer protocols are avoided. Still another aspect of the present invention provides security by making PPP protocol mobility aware and thereby requiring authentication checks before moving a PPP tunnel endpoint. Unlike Mobile IP solution which is specific to the IP protocol, the present invention supports seamless mobility for all networking protocols, including IP.

BRIEF DESCRIPTION OF THE DRAWINGS

These and other objects, features, and advantages of the present invention will become apparent upon further consideration of the following detailed description of the invention when read in conjunction with the drawing figures, in which.

DESCRIPTION OF THE INVENTION

PPP is the most commonly used protocol for connecting mobile devices to the Internet via access points. Since the state associated with the PPP connection is shared between the mobile device and the access point, a new PPP connection establishment is required whenever a mobile host moves to a new access point. Since this process is time consuming and wasteful, the present invention provides a method for preserving an already established PPP connection during hand-offs. The method is implemented by extending the PPP connection beyond the access point; by placing the network side PPP peer in a backend server instead of the access point; and by tunneling the PPP traffic between the access point and the backend server. In this arrangement, the backend server is a gateway to the Internet and the access points are layer-two bridges that forward PPP payloads back and forth between mobile devices and the backend server. When a mobile device moves from one access point a new access point, a new tunnel is established between the new access point. The backend server is prompted to use this new tunnel to send and receive PPP traffic for the moving device. The present invention provides a virtual PPP link which remains fixed to the higher layers even though one end of it moves and the underlying physical access link changes.

Figure 1:
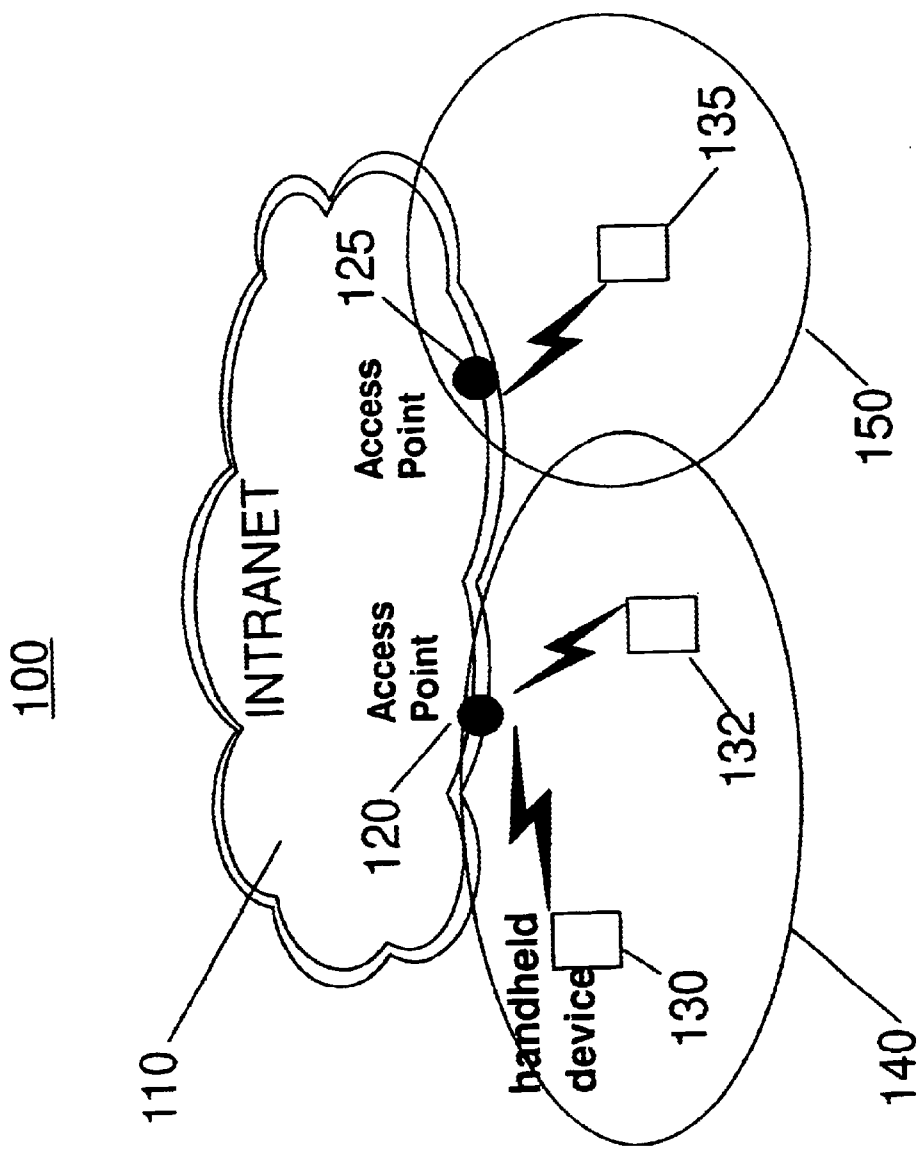
FIG. 1 shows a collection of mobile devices connected to an intranet via wireless access points.
Figure 2:
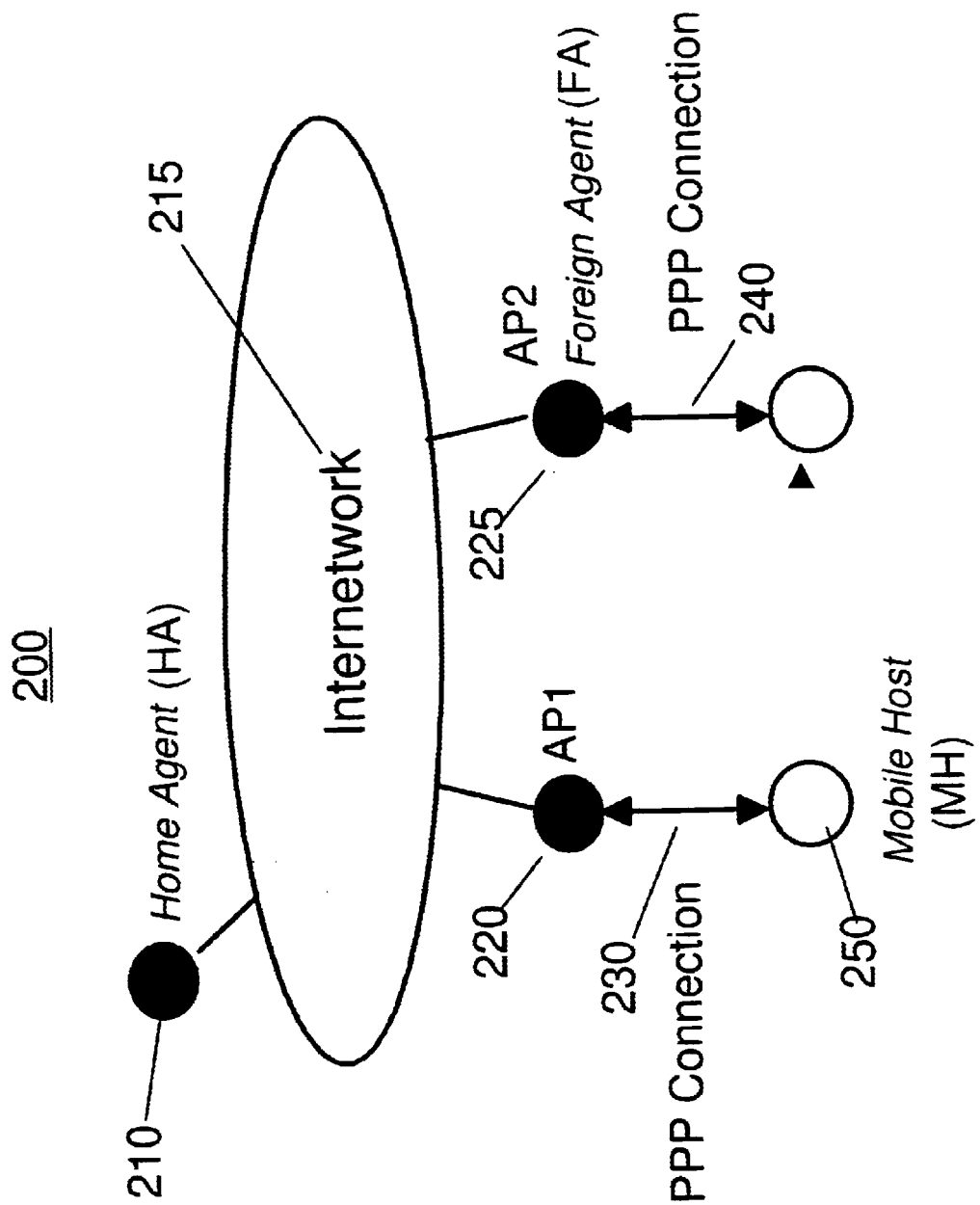
FIG. 2 shows an example of a system running Mobile IP over PPP protocol.
Figure 3:
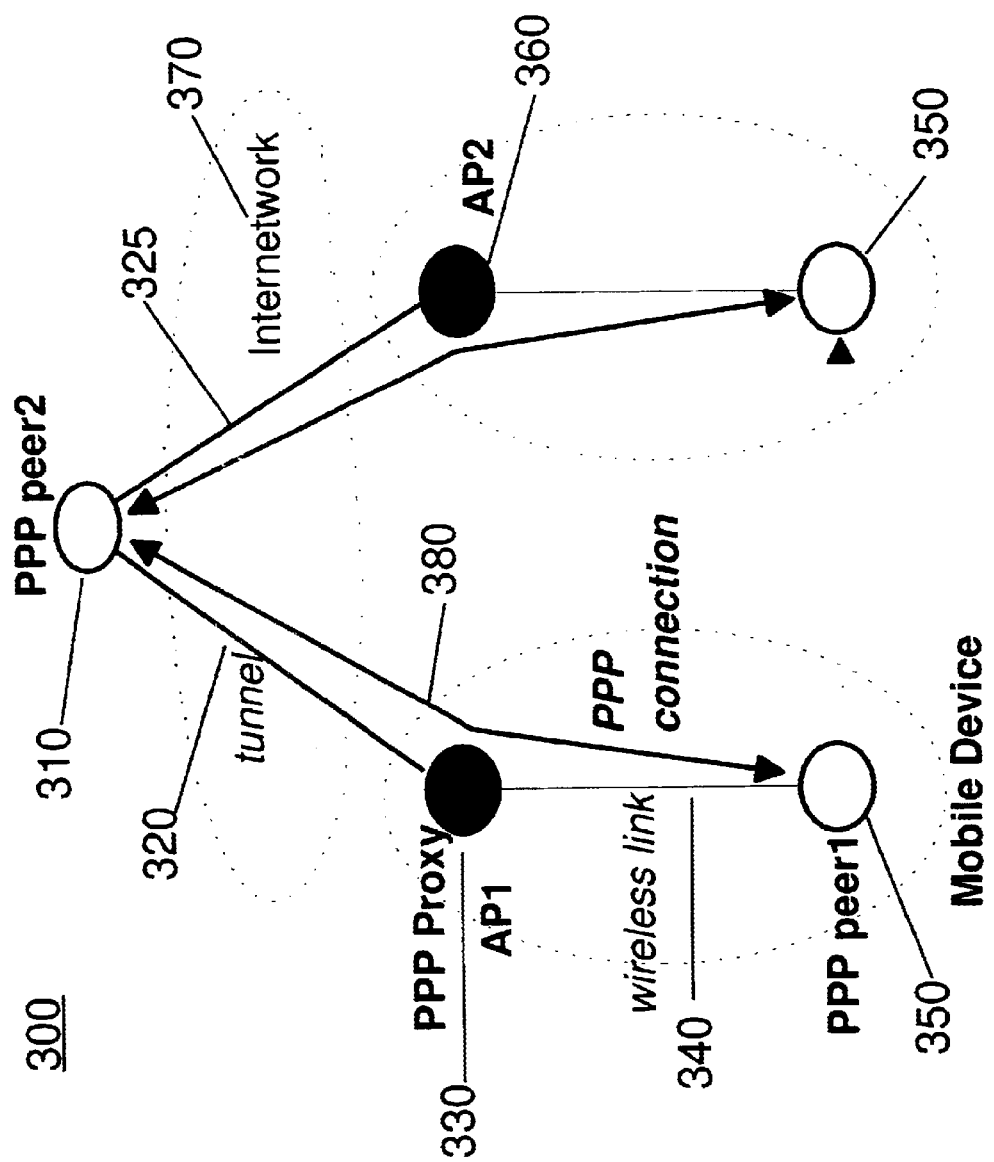
FIG. 3 shows an example connectivity configuration in accordance with the present invention.

FIG. 3 shows an example connectivity configuration 300 in accordance with the present invention. PPP peer-1 350, located in the mobile device, establishes a PPP connection 380 with PPP peer-2 310, located in the backend server that provides the gateway functionality to the Internet. Access point AP1 330 is the point of access of the mobile device to the wired network infrastructure. It also provides the bridging functionality for PPP traffic between the mobile device and the backend server. A tunnel session 320 is established between the access point 330 and the backend server 310 to carry the traffic for the mobile device. When the mobile device moves out of range of AP1 330 to the range of AP2 360, the movement is detected and the backend server is requested to redirect the PPP traffic to the new tunnel session 325 that is established between AP2 360 and the PPP peer-2 310. Then AP2 360 acts as the new bridge for mobile device PPP traffic and communication can resume.

As the above scenario suggests, the present invention provides the following functionalities for a solution to give seamless access and mobility to palmtop devices:

A tunnel establishment and a tunnel redirection protocol between the access points and the backend server. Tunneling protocol should adjust its service level (reliable vs. unreliable) based on the mode in which the PPP protocol is used.

A PPP proxy functionality at the end of the physical link (wireless link), that partially negotiates the physical link layer parameters, partially authenticates the access to the link, and finds out the backend server for the mobile device (if there are more than one such servers).

Authentication of the mobile device before redirecting the tunnel (secure tunnel redirection).

Since we are using a wireless link as an access medium which is prone to eavesdropping and other security attacks, it is highly favorable that the data going over the wireless link is encrypted. Hence we need secure data transmission mechanisms over the wireless link. If end-to-end security is turned on, then we do not need security at the link level. It is desirable to be able to detect if end-to-end security is turned on, and to provide encryption only if it is not turned on.

Detection of hand-offs and triggering new tunnel session establishment and tunnel redirection.

Besides the above functionalities, the followings are important issues that need to be considered:

A fast hand-off mechanism. This requires a fast physical link change detection, registration with the new access point and fast tunnel establishment and redirection protocol.

High performance data transmission. Since tunneling extends the path data packets will travel, it is important that the data packets are transmitted with minimum delay and high reliability.

Since all traffic flows through the backend server, it may be a bottleneck in forwarding the packets. Multiple servers can be used to solve this problem.

Efficient utilization of resources: access point buffers, wireless and tunnel bandwidth, etc.

A flow control and/or maybe a congestion control protocol for the tunnel.

Intelligent packet scheduling at the backend server and access point to provide fair service to multiple flows and also some degree of quality of service.

Providing flow dependent reliability over the access link and over the tunnel.

In the following we describe two example embodiments which provide the aforementioned functionalities. The first embodiment, which we refer to as mobile serial cable protocol, does not require any modification to the PPP implementation at either end-point (i.e., PPP peer-1 350 or peer-2 310). The same protocol can also be used to run any legacy serial port application over the packet network. The second example embodiment, herein referred to as the Mobile PPP protocol, assumes that the PPP software at both end-points can be modified. Although the details of implementation are different for both embodiment, the method underlying both implementations are the same, namely the steps include:

1) establishing a layer 3 tunnel for carrying layer 2 traffic; and 2) redirecting the tunnel end-point when the mobile device moves.

Furthermore, there is a need to re-authenticate the user after tunnel redirection. Though we provide details of only one example method, several derivative methods can be designed by those skilled in the art to achieve the same objective within the scope of this invention. For example, the re-authentication phase may be initiated by the access point, or the mobile device, or the backend server. Also it may be processed by any of the three entities, or by an entirely different authentication service. Similarly, other mobility support procedures, such as tunnel establishment may also be initiated and supported by any of these three entities, or an entirely different mobility support service. Those skilled in the art of network protocol design will know that by borrowing features from the following two protocols, several derivative methods can be designed using the concepts of the present invention.

The Mobile Serial Cable Protocol enables the serial communication applications to run seamlessly while the underlying physical serial link that connects a mobile device to an access point changes. The serial communication application may be a raw serial port application such as hotsync, or it may be a higher layer network protocol such as PPP.

Figure 4:
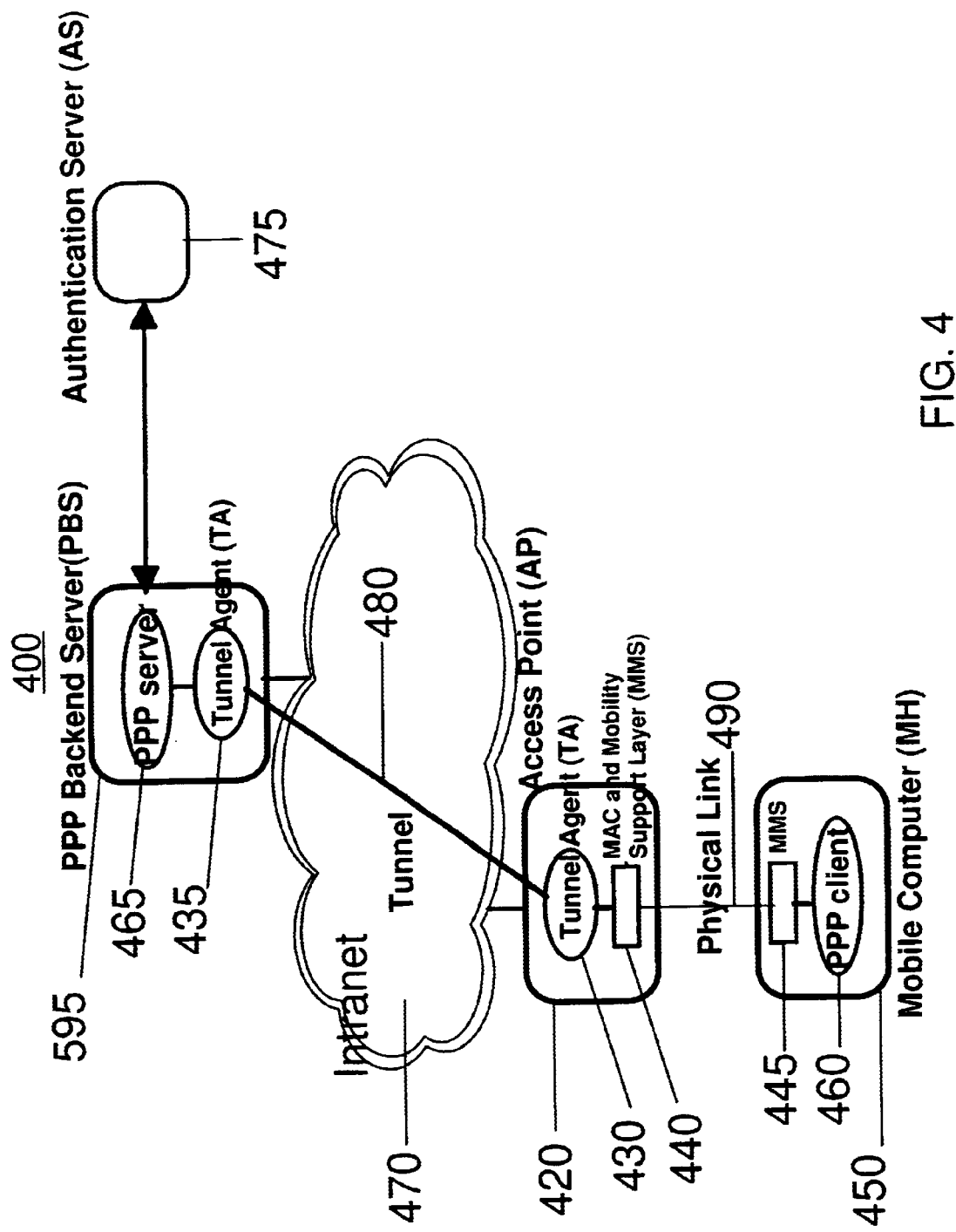
FIG. 4 shows an example of software modules used and their interconnection in accordance with the present invention.

FIG. 4 shows an example of software modules comprising the Mobile Serial Cable Protocol used and their interconnection in accordance with the present invention. It shows the components of the mobility architecture: basic entities and their sub components. The basic entities of the architecture are: mobile computers (devices), access points and backend servers. Each of these entities have sub components which have distinct functions. Throughout the discussion, we will use PPP as the example higher layer protocol that runs over the emulated multi-hop serial cable. It is important to point out that the method described below is not limited to supporting PPP only. In fact, after tunnel establishment any serial line application can be run between the mobile device and the backend server.

A mobile device 450 is the starting point of a virtual serial cable emulation. It has two components:

1) A Medium Access Control and Mobility Support Layer (MMS) 445, which coordinates access to the physical medium, emulates a serial cable over a packet-oriented MAC layer, and implements mobility support functions such as detecting the hand-offs, etc.

2) A higher layer protocol that is run over the serial cable emulation. In this case, it is PPP 460.

A mobile device can be connected to an access point over a shared medium or over a dedicated link. If a shared medium is used, such as a wireless link, then a MAC layer is needed at the mobile device. If a dedicated medium is used, such as an RS-232 cable or a wireless modem, then there is no need for a MAC layer and a serial line emulation layer, we just need a mechanism to detect the hand-offs.

Access Points

An access point 420 is the termination point of a physical access link that connects a mobile device to a network infrastructure. An access point includes the following main components:

1) A Medium Access Control and Mobility Support Layer (MMS) 440. This layer is responsible for controlling the access to the medium and registration of new mobile devices that come into the range of the access point. Our mobility protocol is independent of the physical media that connects a mobile device to an access point. A MAC layer is needed only if the medium is shared.

2) A Tunneling Agent 430, that tunnels the traffic of a mobile device to a backend server. A tunneling agent sits above the MAC layer. A tunneling agent in an access point corresponds with a tunneling agent in a backend server and is responsible for establishing, maintaining, and releasing tunnel sessions that will carry the traffic of a mobile device between an access point and the backend server.

Backend Server

A Backend Server is the termination point of a virtual link. It includes two components:

1) A tunnel agent that is the termination point of tunnels from other tunnel agents.
2) The higher layer protocol entities that is run over the virtual link, such as PPP servers.

A backend server usually communicates with more than one access point, and each access point can communicate with more than one mobile device. The backend server is the termination point of all the virtual links originating from these mobile devices. Therefore it may run more than one higher layer protocol associated with each virtual link.

A single tunnel agent running on a backend server communicates with the PPP servers and also with other tunnel agents running on other access points. Each PPP server communicates with a PPP client through a tunnel session. The tunnel agent keeps the association of the PPP server with the corresponding tunnel session.

Authentication Server

If the higher layer protocol is PPP, the PPP server may need to check the authentication information of the PPP client by consulting to a database. If more than one PPP backend servers is used, it is better to have the authentication information stored in a central location so that all backend servers may consult to that well-known server. Therefore, an authentication server is useful when there is more than one PPP backend servers.

Protocol Description

Figure 5:
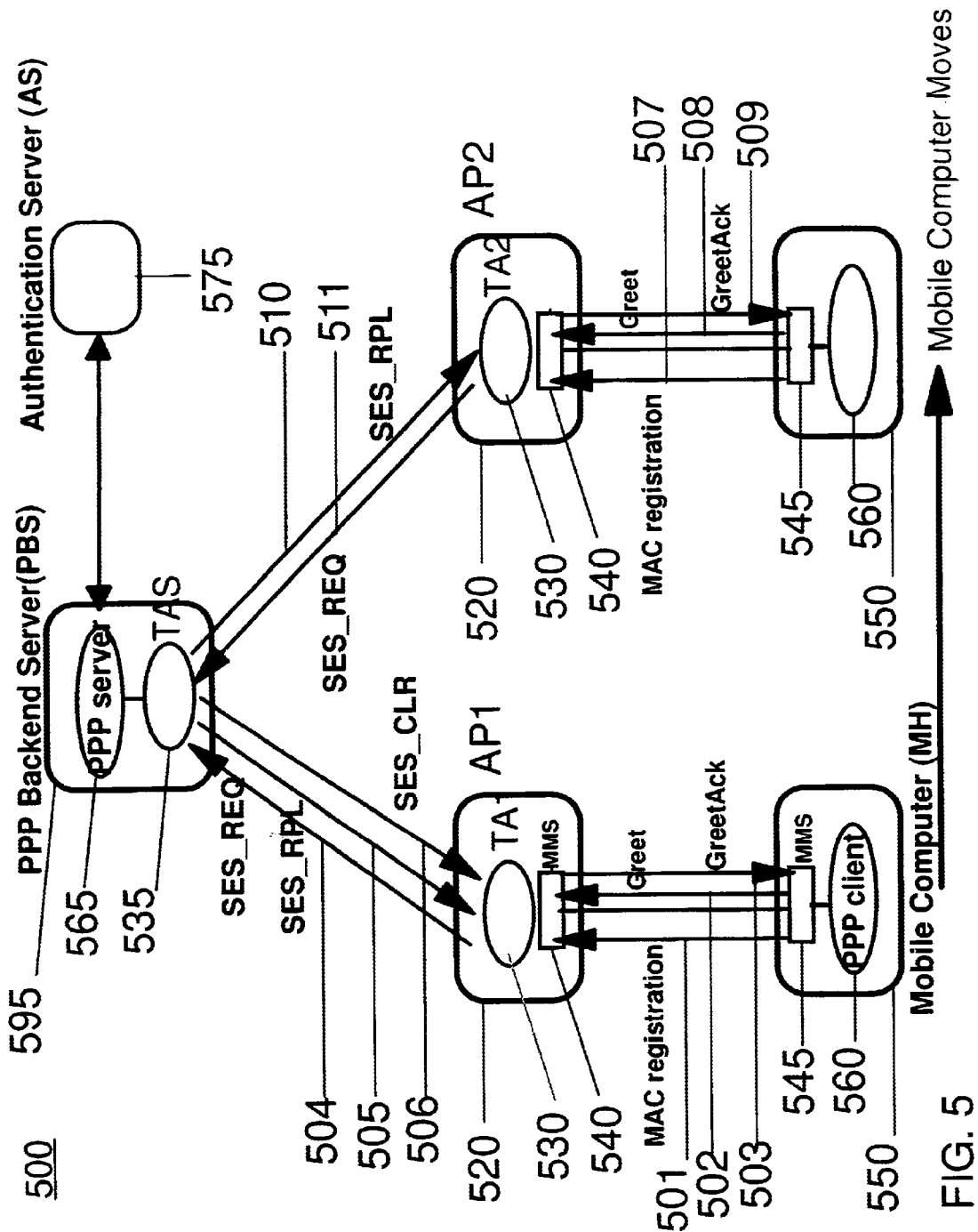
FIG. 5 shows an example of messages exchanged between access points and a backend server during tunnel establishment and tunnel re-direction in accordance with the present invention.

FIG. 5 shows an example of messages exchanged between access points and a backend server during tunnel establishment and tunnel re-direction in accordance with the present invention; A virtual link, emulated between a mobile device and a backend server, includes two parts:

1. An access link from a mobile device to an access point.
2. A tunnel from an access point to a backend server.

The mobility protocol is responsible from establishing, maintaining and releasing a virtual link, transporting higher layer traffic through the link and redirecting the traffic to a new virtual link when a mobile device moves to a new access point. Higher layer data is transported via the MAC protocol between a mobile device and an access point, and through the tunneling protocol between an access point and backend server.

PPP Connection Establishment

When a mobile device 550 initiates PPP connection establishment, a PPP Connection Request Packet (LCP Conf-Req) is generated by the PPP client on the mobile device and sent out through the serial port. The MMS module 545 receives the packet and starts the establishment of a virtual link towards the PPP backend server 595. Further communication between PPP peers will be through the virtual link once it has been established.

After receiving the initial PPP LCP Connection-Request packet, the MMS module 540 sends a Greet message 502 to the access point 520. The Greet message 502 indicates to the access point 520 that the mobile device 550 wants to establish a PPP connection, and therefore wants a tunnel session to be established to the backend server 595 to carry the PPP traffic. Upon receipt of the Greet message 502, the access point starts the tunnel establishment procedure.

Each access point is configured with a default PPP backend server. If the Greet message coming from the mobile device does not specify a specific backend server for tunnel establishment, the access point establishes a tunnel to the default backend server. If the Greet message contains the IP address of a specific PPP backend server, then the access point establishes a tunnel to that backend server. The second case occurs when a mobile device has already established a PPP connection to a backend server before handing off to this access point.

An access point 520 sends a $SES_{13}$ REQ 504 (session request) message to the backend server to establish a tunnel session for the mobile device. The SES_REQ message 504 includes the IEEE MAC address of the mobile device. This address is used as the unique identifier for the mobile device at the backend server. If the backend server has enough resources to run a PPP server for the mobile device, it replies back with a SES_RPL (session reply) message 505 that contains a result code and a random secret key. The key will be communicated to the mobile device 550. The mobile device 550 has to supply this key to the backend server 595 when it wants to redirect the PPP traffic to a new tunnel session. This is required to prevent tunnel redirection attacks to already established PPP connections by malicious users. The SES_REQ 504 and SES_RPL 505 messages also contain the receiver buffer size information for flow control. When the access point 520 gets the SES_RPL message 505 from the backend server with a positive result code, the tunnel session establishment procedure is completed. The access point sends a Greet_Ack message 503 to the mobile device. The Greet_Ack message 503 contains a result ode denoting whether tunnel session establishment was successful or not. If it was successful, the Greet message contains also the IP address of the backend server and a secret key. The backend server IP address and the secret key are stored in the MMS module 545 of the mobile device 550 and used when the mobile device hands off to a new access point before terminating the PPP connection.

When the mobile device receives a Greet_Ack message from the access point with a positive result code, a virtual link is ready to transport PPP frames between the mobile device and the backend server. At this point, the MMS module starts sending the buffered PPP frames received from the PPP client to the access point. The initial PPP packets sent through the virtual link are PPP control packets to establish a PPP connection. When the backend server receives the initial PPP Connection Establishment Request packet, it creates a PPP server process and binds it to the tunnel session (to the virtual link). Then the normal PPP communication between the PPP client running on the mobile device and the PPP server running on the backend server can start running through the virtual link. First a PPP connection is established between the client and server and then upper layer network datagrams are transported inside PPP frames through the virtual link.

Hand-off to a New Access Point

When a mobile device hand-offs to a new access point, it first registers itself with the new access point at the MAC layer. If the mobile device has established a PPP connection which is still not terminated, a Greet message is sent to the new access point. The Greet message contains the IP address of the backend server to which a PPP connection has been established and the secret key obtained earlier with the first tunnel session establishment for this mobile device. A Greet message is sent only if there is an ongoing PPP connection. Therefore, an access point attempts to establish a tunnel session for a mobile device only if the mobile device wants to establish a PPP connection, or if it has an ongoing PPP connection and was handed off to this access point. Otherwise an access point registers a mobile device coming to its region at the MAC level, but does not establish a tunnel session to a backend server.

Upon receipt of the Greet message from the mobile device, the access point starts establishment of a tunnel session between itself and the backend server. The access point sends a SES_REQ message to the backend server with the IEEE MAC address of the mobile device and the secret key in it.

When the backend server receives the SES_REQ message, it can detect from the IEEE MAC address of the device that the mobile device has an active PPP session and a PPP server running it. In this case, the backend server needs to change the binding of the PPP server to the new tunnel session. If the secret key supplied by the mobile device is the one that the backend server has assigned to it, the backend server changes the binding and sends a SES_RPL message to the new access point with a positive result code. If the supplied secret key is not the same as the one assigned, the backend server does not change the binding and sends a SES_RPL message to the new access point with a negative result code. If the binding is changed, a SES_CLR (session clear) message is sent to the old access point to clear the old tunnel session.

When the new access point receives the SES_RPL message with a positive result code, a tunnel establishment and PPP traffic redirection procedure is completed. The access point sends a Greet_Ack message back to the mobile device with a positive result code. When the mobile device receives the Greet_Ack message, indicating that a new virtual link between the mobile device and the backend server has been established, the PPP traffic starts flowing again.

In this way, PPP connections are preserved while mobile devices roam through the ranges of multiple access points. Only the underlying virtual links are changed. The establishment of a virtual link takes one round-trip time delay between a mobile device and a backend server, whereas establishment of a PPP connection takes several round-trip times.

PPP Connection Termination

Figure 6:
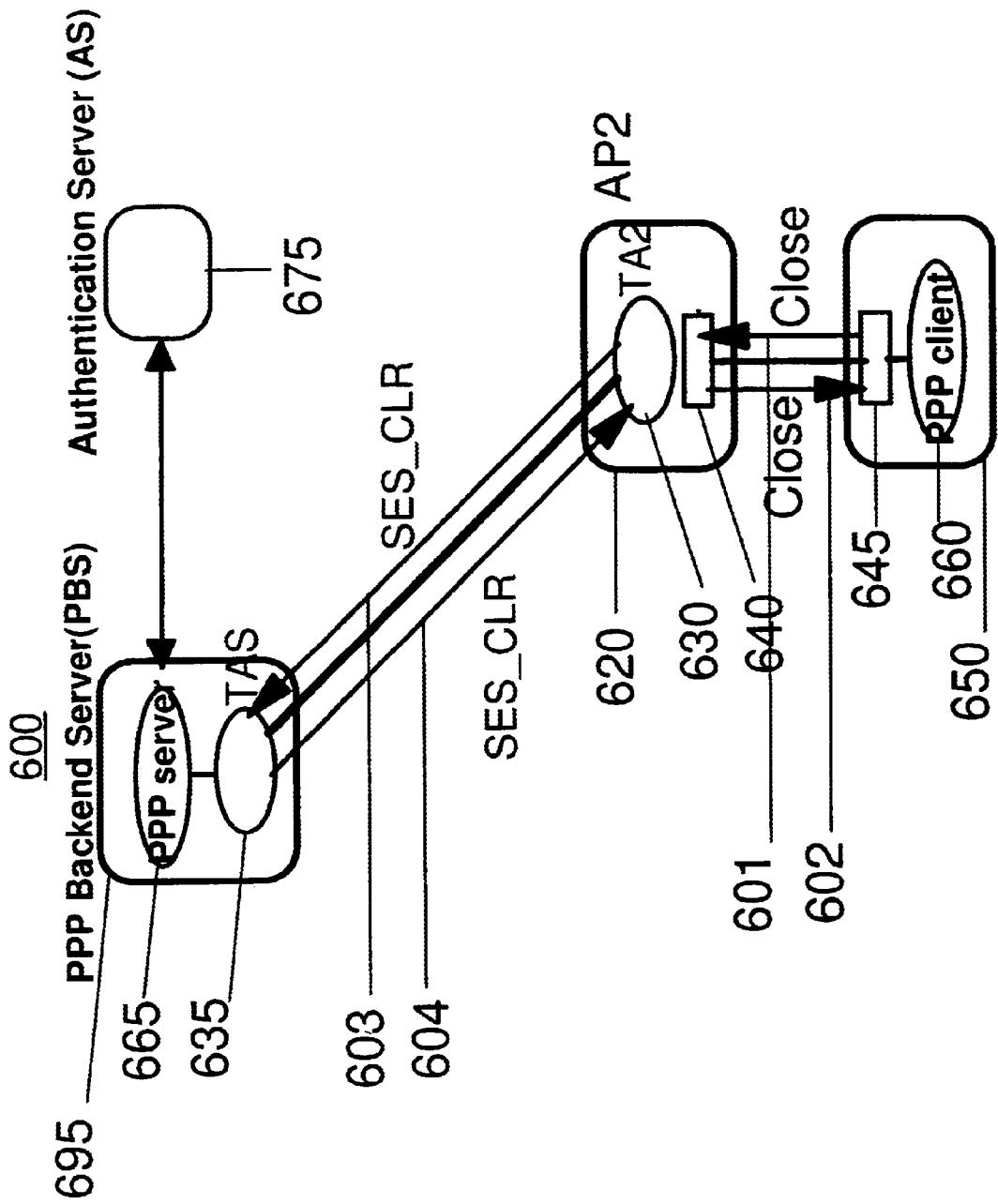
FIG. 6 shows an example of messages exchanged between a PPP client, an access point, and a backend PPP server during PPP connection termination in accordance with the current invention.

FIG. 6 shows an example embodiment 600 of messages exchanged between a PPP client 660, an access point 620, and a backend PPP server 695 during PPP connection termination in accordance with the current invention. Both PPP client 660 and PPP server 665 can initiate the termination of a PPP connection. A PPP connection termination request packet (LCP Term-Req) is sent from the PPP entity that wants to terminate the PPP connection. The termination request packet is transported through the virtual link to the other PPP entity. Upon receipt of a termination request packet, the other PPP entity sends an acknowledgment packet and terminates. The acknowledgment packet is transported back to the PPP peer initiating the termination. Upon receipt of the acknowledgment, the originating PPP peer also terminates.

Our protocol snoops for termination request and acknowledgment packets. After a termination acknowledgment is sent to the respective PPP peer, the virtual link can be released. If the mobile device 650 initiates the release of the virtual link, it sends a Close message 601 to the access point 620 which then closes the corresponding tunnel session by sending a SES_CLR 603 message to the backend server 665. If the backend server 695 initiates the termination of the virtual link, it sends a SES_CLR message 604 to the access point 620 to clear out respective the tunnel session. Upon receipt of this message, the access point 620 deletes the state information for the tunnel session and sends a Close message 602 to the mobile device 650. The mobile device 650 then clears out the state for the PPP connection and virtual link.

PPP Authentication

During PPP connection establishment phase, a PPP client authenticates itself to a PPP server in order to successfully establish PPP connection. A PPP client sends its authentication information to a PPP server which then checks the supplied information against its user authentication database. If all PPP backend servers use local authentication servers 675, then a mobile device can only establish a PPP connection to a pre-configured PPP backend server. This is undesirable because it requires pre-configuration of a mobile users with fixed PPP backend servers and it also prevents distribution of the loads of mobile users to PPP backend servers in a dynamic fashion.

Therefore, instead of using local databases, one embodiment uses a central PPP authentication database for all PPP backend servers. A PPP server consults this central server to retrieve the authentication information of a mobile user. What exactly is stored in the authentication server database depends on the authentication protocol used. For PAP authentication for example, user name/password pairs are stored.

Mobility Across Different Backend Servers

When a mobile device moves to the range of a new access point which is configured with a different default PPP server than the PPP server with which the mobile device has established a PPP connection, then the new access point tunnels the PPP traffic to the original PPP server with which the mobile device has established a connection before, not to the default PPP server. When the mobile device moves to the range of the new access point and it has an on-going PPP connection, then it gives the IP address of this PPP server to the access point inside the Greet message so that the access point opens a tunnel session to this PPP backend server.

Tunneling Protocol

Tunneling protocol is responsible for establishing, configuring, and terminating tunnel sessions to carry PPP traffic between access points and the PPP backend server. It is also responsible for implementing the appropriate transport mechanism to transport the PPP traffic. This includes flow control, reliability, etc.

Message Types and Formats

There are two types of tunneling protocol messages: control messages and payload messages. Control messages are used to establish, redirect, and clear tunnel sessions. Payload messages are used to carry user data: PPP frames. For all the messages, the message format includes a tunnel header followed by a payload (control message payload or data message payload). A data payload is a compete PPP frame as it is received from a PPP peer. A PPP frame is not transformed, unbytestuffed or stripped off the header. It is transported through the tunnel as it would be normally transported without a tunnel over a serial link. Table 1 shows a typical tunnel header.

Tunnel Header

TABLE 1

| Flags | Length | Tid | Sid | Rn | Sn | Mtype |
| --- | --- | --- | --- | --- | --- | --- |

Flags: bit 0: indicates if this is a control message or payload message (1: control message, 0: payload message).

Length: provides the total length of the message including the tunnel header and payload.

Tid: This field is used to multiplex/demultiplex the packets belonging to different tunnels when there are multiple logical tunnels multiplexed into single transport media connection from an access point to the backend server.

Sid: This field is used to multiplex/demultiplex different tunnel sessions in a single tunnel. Multiple sessions (one for each mobile device) can go through a single tunnel.

Rn: indicates next sequence number expected. This field is used when reliability is turned on.

Sn: indicates the sequence number of this message. This field is used when reliability is turned on.

Mtype: indicates the type of a control message. This field is not used for payload messages.

Control Messages

SES_REQ: session request message. It includes the following information elements:

Ass_sid (2 bytes): assigned session identifier. The sending party assigns a session identifier unique to the session and sends it inside this message to the other party. The other party uses this identifier with each message its sends in the sid field of the tunnel header.

Ieeemacaddr (6 bytes): gives the IEEE MAC address of the mobile device. The access point uses this field to convey the identity of the mobile device to the backend server.

SES_RPL: session reply message. It includes the following information elements:

Ass_sid: The session identifier assigned by the backend server and will be used by the access point for every packet tunnel header sent from the access point to the backend server.

Code (2 bytes): the result code of the operation performed at the server for the corresponding SES_REQ message.

C_REDIRECTED, C_NEWSESSION are defined to indicate redirection and/or a new session.

Secret Key (4 bytes): the secret key assigned by the backend server. This key is stored in the mobile device and supplied to the backend server when the mobile device wants to redirect the tunnel session.

SES_CLR: session clear message includes an information element:

Code: the result code.

Vertical Protocol Architecture

Figure 7:
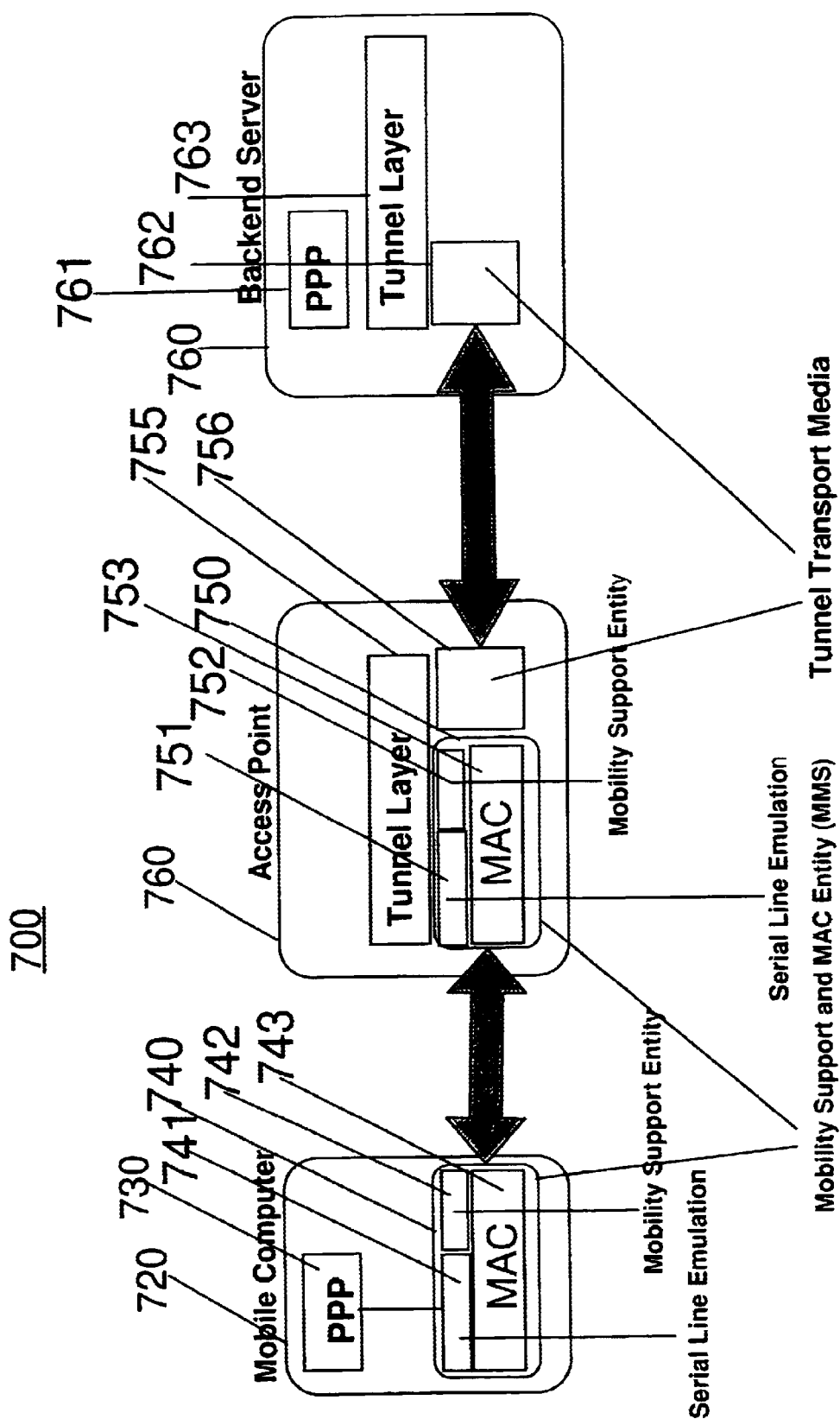
FIG. 7 shows an example layering of modules used for implementing Mobile PPP protocol in accordance with the present invention.

FIG. 7 shows an example of a vertical protocol architecture 700 used in an embodiment of the present invention. In a mobile computer 720, PPP client 730 sits on top of a serial line emulation layer 741. Serial line emulation layer is located on top of a MAC layer 743. A mobility support entity is also located on top of the MAC layer 742.

In an access point 760, a serial line emulation layer 751 and a mobility support layer 752 are again located on top of a MAC layer 753. We will refer to the combination of MAC layer, serial line emulation layer, and mobility support layer as the MAC and Mobility Support Layer (MMS), both in an access point 750 and in a mobile computer 740. A tunneling layer 755 is located on top of the MMS layer 750 in an access point. The messages of tunneling layer are conveyed using a tunneling transport media 764 to the backend server. The tunneling transport media can be UDP, TCP, or ATM SVC, etc.

In a backend server 760, A tunneling layer 763 is again located on top of a tunnel transport media 762. PPP server(s) 761 are located on top of the tunneling layer 763.

An objective of the Mobile PPP protocol is to make the PPP protocol mobility aware. The PPP protocol provides a packet oriented interface over asynchronous serial lines. It is a connection oriented peer-to-peer protocol, where one peer resides at the user device (user-side-PPP) and the other peer resides at the PPP server that acts as the gateway to the Internet (network-side-PPP). According the original PPP specification, network-side PPP is located at the end of the access link connecting a user to the network (a PSTN dialup connection, or a serial cable connection from the user device to the computer).

The original PPP specification is considered for enhancement by separating the termination point of the access link from the termination point of the PPP connection. This is to separate the termination point of the access link from the point where the network-side PPP peer will reside. It is highly probable for mobile users that the access link would change during the lifetime of a PPP connection. Unfortunately, neither PPP nor the enhancement provide support for preserving PPP connections when the underlying physical access link changes. The present invention uses the concept of separating the network-side PPP peer from the termination point of the access link. A tunneling layer between the PPP and the access link is responsible for managing and redirecting the end-point of the access link.

In an example embodiment of a mobile PPP protocol the following components participate:

Mobile device: wherein user-side PPP peer is located.

Access point: wherein a PPP-proxy is located. This is the termination point of access link or dialup connection from the mobile device.

Backend Server: wherein a network-side PPP peer is located. The backend server is the end of the tunnel between the PPP proxy and network-side PPP peer.

Figure 8:
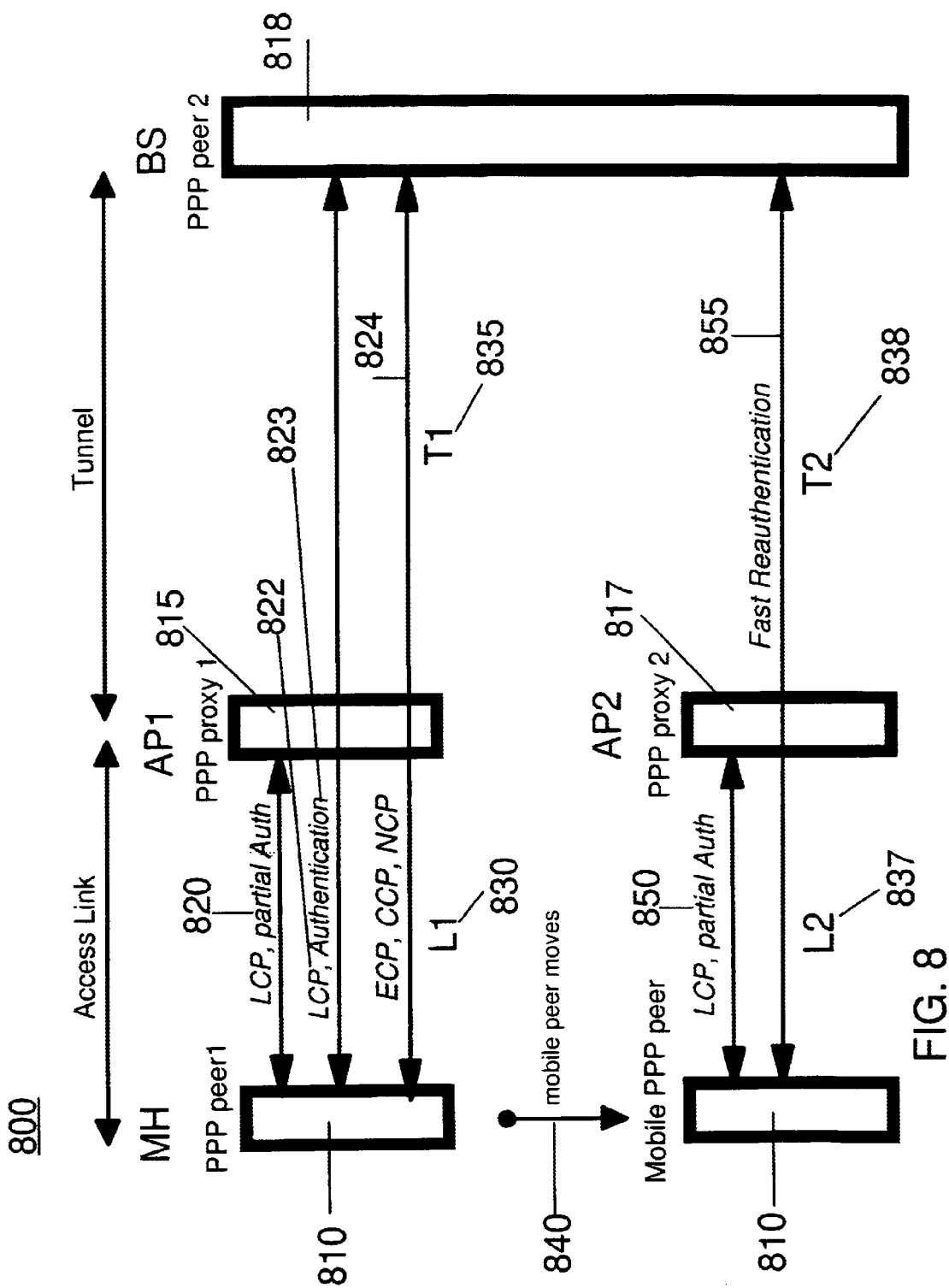
FIG. 8 shows an example of protocol negotiations during handoff in accordance with the present invention.

FIG. 8 shows an example embodiment of protocol negotiations during handoff in accordance with the present invention. Normally, the PPP protocol establishes a PPP connection in 3 phases: LCP phase, Authentication phase (ACP), and NCP phase. The first time that a PPP connection is established from a mobile device, the LCP phase 820 is negotiated between the mobile host MH 810 and an access point 815, AP1, which is the termination point of the access link L1 830. This negotiation is required between the MH 810 and AP1 815 because some of the LCP options are related to the specific link media, such as ACCM option. Then the MH 810 sends its partial authentication information 820, such as its user name, so that the AP1 815 can find out the backend service, BS, 818 (if there is a possibility that more than one BS may exist serving different users). The user name is also useful for finding out what kind of service this MH 810 wants from AP1 815: a mobile PPP service, a virtual PPP service, or a normal PPP service where the PPP connection is terminated in the AP1 815 itself.

After finding out the location IP address of the BS 818, the AP1 815 initiates tunnel establishment procedure towards the BS 818. The purpose of the tunnel establishment procedure is to create a tunnel session between the AP1 815 and BS 818 to bridge the PPP traffic from MH 810 to BS 818.

A connection oriented tunnel session is recommended because some state information about the tunnel session may be kept at tunnel end-points to facilitate flow control, reliability and other necessary transport features. The initial tunnel establishment message may contain the partial authentication information of the MH 810.

When the tunnel session request is received by BS 818, an LCP phase 822 is started between MH 810 and BS 818. At the same time the BS 818 can reply to a tunnel establishment request to finish the tunnel establishment procedure. In some embodiments, the LCP phase 822 between MH 810 and BS 818 is started after finishing the tunnel session establishment between AP1 815 and BS 818. An LCP phase is used between MH 810 and BS 818 because most of the options negotiated with the LCP protocol are peer-to-peer options that have to be negotiated between the two PPP peers, such as the MRU (maximum receivable unit size) option.

After the completion of the LCP phase, the authentication procedure (ACP) 823 can be started. As part of the authentication process, a cookie is sent by BS 818 to MH 810 in a secure manner (so that a wire-tapper can not read it). The cookie is used later for fast re-authentication after the MH 810 moves to a new access point 817 and instructs the BS 818 to redirect the PPP tunnel.

If the authentication phase 823 succeeds between MH 810 and BS 818, the PPP negotiation can proceed to the network protocol negotiation phase (NCP), and optionally to the encryption protocol negotiation phase (ECP) and to the compression protocol negotiation phase (CCP) 824. After successful completion of these phases 824, the data flow between MH 810 and BS 818 can begin.

If the authentication 823 fails between MH 810 and BS 818, either after tunnel session establishment or during tunnel session establishment, the tunnel between the AP1 815 and BS 818 is removed. In summary, the following three steps are carried out in sequence:

LCP 820 between MH 810 and AP1 818,

LCP and authentication 822–823 between MH 810 and BS 818, finally, NCP and optionally ECP and CCP 824 between MH 810 and BS 815.

When MH moves to a new access point 817, two things change: the access link 837 and the access point 817. As a result, the old tunnel from the previous access point 815 to the BS 818 is redirected.

When the MH 810 moves to a new access point AP2, 817, it starts the LCP phase 850 again with AP2 817. This is because some of the link media related parameters are renegotiated on the new link 837. The initiation of the LCP phase 850 can be started by the AP 817 or the MH 810, depending upon who first becomes aware of the change in link connectivity. After the LCP phase 850 is completed, MH 810 sends its partial authentication information (usually a username) together with the cookie it received in 824 as part of the fast authentication process 838. AP2 817 uses the username to find out the BS 818 and initiates a tunnel establishment procedure towards the BS 818. It can also send the cookie inside the tunnel control messages. BS 818 authenticates the user by checking the cookie. If authentication fails, then the tunnel session establishment procedure is aborted and the tunnel is cleared. The MH 810 after receiving the authentication failed message, tries to re-establish the connection or terminate the PPP connection.

The data flow resumes between MH 810 and BS 818 after the fast authentication phase 855 succeeds. There is no need to carry out an LCP negotiation between MH 810 and BS 818 again, since characteristics of both peers remain unchanged. Similarly, there is also no need to carry out NCP, ECP, or CCP phases. This makes the handoff completely transparent to the network layers. If an encryption or compression protocol is negotiated during the initial PPP establishment, the same method can be used after the handoff. Since some packets may be lost during the handoff, the PPP may reset the encryption and compression states. No explicit mechanisms are needed to account for this since the PPP protocol is already capable of making adjustments for the lost packets.

Thus an embodiment of the present invention provides a method for a mobile device to roam securely and seamlessly from one access point to another access point without disrupting an active PPP connection. The method includes establishing, maintaining, and/or terminating a PPP connection between a mobile device and a PPP server via an access point. The mobile device is equipped with a serial asynchronous communication interface. The PPP server is attached to a packet switched data network. The access point acts as a bridge between the serial communication interface and the packet switched communication interface.

An embodiment of the method includes receiving the PPP connection establishment frame at the access point from the mobile device over the serial communication interface; establishing a bi-directional network layer tunnel between the access point and the PPP server over the packet switched network; forwarding the PPP connection establishment frame to the PPP server over the network layer tunnel; maintaining the flow of PPP frames between the PPP server and the mobile device via the access point by forwarding the PPP frames received from the mobile device to the PPP server over the network layer tunnel and forwarding the PPP frames received from the PPP server over the network layer tunnel to the mobile device over the serial asynchronous communication interface; and terminating the bi-directional network layer tunnel between the access point and the PPP server after the completion of the PPP connection.

Another embodiment of the present invention emulates a direct RS-232 cable connection between a mobile device and another computer located several hops away from the mobile device. The present invention also provides a method of keeping the RS-232 cable emulation between the mobile device an another computer system intact despite changes in mobile device's location in the network. The method described herein includes the steps of establishing a PPP connection between two PPP peers through a PPP proxy and then tunneling traffic between the proxy and a PPP peer.

Still another embodiment of the invention implements a method of exchanging cookies between peers at the PPP connection establishment time and using them for fast reauthentication. This provides a secure method of switching from one PPP proxy to another PPP proxy without disrupting the end to end PPP connection. The advantages of the invention include minimization of control traffic during handoff, and support for multiprotocol mobility without requiring any changes to the mobile device software.

There are several other considerations that are important. Some example embodiments implement a proxy based architecture providing separation of the termination point of physical access link from the termination point of a PPP connection and using a PPP proxy for providing mobility support at the termination point of the access link. The present invention is useful for an apparatus implementing all necessary mobility protocol extensions and, when attached to the mobile device, providing seamless mobility support to the mobile device. The same methods are also useful for providing performance enhancements during hand-offs by buffering packets at the tunnel entry point.

This invention may be provided as a process, an article of manufacture, apparatus, system, architecture and/or a computer product. For example, it may be implemented as an article of manufacture comprising a computer usable medium having computer readable program code means embodied therein for causing a computer to perform the methods of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software is a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

It is noted that the foregoing has outlined some aspects and embodiments of the present invention. This invention may be used for many applications, connections, protocols and languages. Thus, although the description is made for particular arrangements and methods, the intent and concept of the invention is suitable and applicable to other arrangements and applications. For example the invention is useful for a non-mobile device having to change the host to which it is connected by host-to-host handoff. Thus, it will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

All variations and modifications of the concepts of the present invention known to those skilled in the art are intended to be included within the scope of the invention as defined in the appended claims:

What is claimed is:

1. A method comprising:
    establishing a PPP connection between a mobile device and a PPP server via an access point, wherein the mobile device is equipped with a serial asynchronous communication interface, the PPP server is attached to a packet switched data network via a packet switched communication interface, and the access point is acting as a bridge between the serial asynchronous communication interface and the packet switched communication interface, by:
        receiving a PPP connection establishment frame at the access point from the mobile device over the serial asynchronous communication interface;
        establishing a bi-directional network layer tunnel between the access point and the PPP server over the packet switched data network;
        forwarding the PPP connection establishment frame to the PPP server over the biderectional network layer tunnel; and
        maintaining the flow of PPP frames between the PPP server and the device via the access point by forwarding PPP frames received from the mobile device to the PPP server over the bi-directional network layer tunnel, and forwarding the PPP frames received from the PPP server over the bi-directional network layer tunnel to the mobile device over the serial asynchronous communication interface.

2. A method as recited in claim 1, wherein a service level of the bi-directional network layer tunnel is adjusted based on a mode in which a PPP protocol is used.

3. A method as recited in claim 1, wherein the serial asynchronous communication interface is RS-232.

4. A method as recited in claim 3, where the RS-232 interface is provided on top of a packet oriented wireless MAC layer.

5. A method as recited in claim 1, wherein the step of establishing the bi-directional network layer tunnel is started after receiving a PPP LCP Configure request frame from the mobile device.

6. A method as recited in claim 1, wherein the access point also acts as a PPP proxy and the step of establishing the bi-directional network layer tunnel is started after completing a PPP LCP negotiation with the access point.

7. A method as recited in claim 1, further comprising terminating the bi-directional network layer tunnel between the access point and the PPP server after the completion of the PPP connection.

8. A method as recited in claim 7, wherein the step of terminating is started after the transmission of a LCP Term-Req ack message.

9. A method comprising:
    establishing a connection between a mobile device and a server via an access point, wherein the mobile device is equipped with a serial asynchronous communication interface, the server is attached to a packet switched data network via a packet switched communication interface, and the access point is acting as a bridge between the serial asynchronous communication interface and the packet switched communication interface, by:
        receiving a connection establishment frame at the access point from the mobile device over the serial asynchronous communication interface;
        establishing a bi-directional network layer tunnel between the access point and the server over the packet switched data network;
        forwarding the connection establishment frame to the server over the bi-directional network layer tunnel; and
        maintaining the flow of frames between the server and the mobile device via the access point by forwarding frames received from the mobile device to the server over the bi-directional network layer tunnel, and forwarding the frames received from the server over the bi-directional network layer tunnel to the mobile device over the serial asynchronous communication interface.

10. A method as recited in claim 9, wherein the connection employs a PPP protocol.

11. An article of manufacture comprising a computer usable medium having computer readable program code means embodied therein for causing establishment of a connection between a mobile device and a server via an access point, wherein the mobile device is equipped with a serial asynchronous communication interface, the server is attached to a packet switched data network, and the access point is acting as a bridge between the serial asynchronous communication interface and the packet switched communication interface, the computer readable program code means in said article of manufacture comprising computer readable program code means for causing a computer to effect:

- receiving a connection establishment frame at the access point from the mobile device over the serial asynchronous communication interface;
- establishing a bi-directional network layer tunnel between the access point and the server over the packet switched data network;
- forwarding the connection establishment frame to the server over the bi-directional network layer tunnel; and
- maintaining the flow of frames between the server and the mobile device via the access point by forwarding frames received from the mobile device to the server over the bi-directional network layer tunnel, and forwarding the frames received from the server over the bi-directional network layer tunnel to the mobile device over the serial asynchronous communication interface.

12. An article of manufacture as recited in claim 11, wherein the access point also acts as a PPP proxy and the step of establishing the bi-directional network layer tunnel is started after completing a PPP LCP negotiation with the access point.

* * * * *